United States Patent
Lombardo et al.

(10) Patent No.: US 8,619,304 B2
(45) Date of Patent: Dec. 31, 2013

(54) METHOD AND SYSTEM FOR AUTOMATICALLY RECOMMENDING RULES BASED ON DESIRED PRINT CRITERIA

(75) Inventors: Matthew John Lombardo, Rochester, NY (US); Peter Victor Cech, Pittsford, NY (US); Daniel Rupe, Fairport, NY (US); Bijender S. Malik, Webster, NY (US); Matthew Scrafford, Fairport, NY (US); Jason Tsongas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 336 days.

(21) Appl. No.: 13/197,857

(22) Filed: Aug. 4, 2011

(65) Prior Publication Data
US 2013/0033723 A1 Feb. 7, 2013

(51) Int. Cl.
*G06F 3/12* (2006.01)
*G06K 15/00* (2006.01)

(52) U.S. Cl.
USPC .................. 358/1.15; 358/1.13; 358/1.18

(58) Field of Classification Search
None
See application file for complete search history.

(56) References Cited

U.S. PATENT DOCUMENTS

| | | | |
|---|---|---|---|
| 5,305,117 A | 4/1994 | Oshita | |
| 6,608,698 B1 | 8/2003 | Lyons et al. | |
| 2004/0017577 A1 | 1/2004 | Ostrover et al. | |
| 2010/0195138 A1 | 8/2010 | DeRoller | |
| 2010/0274599 A1* | 10/2010 | DeRoller | 705/7 |
| 2011/0037996 A1* | 2/2011 | DeRoller | 358/1.15 |
| 2011/0097099 A1 | 4/2011 | Matsumoto et al. | |

* cited by examiner

*Primary Examiner* — Dov Popovici
(74) *Attorney, Agent, or Firm* — Kermit D. Lopez; Luis M. Ortiz; Ortiz & Lopez, PLLC

(57) ABSTRACT

A method and system for automatically creating and recommending a set of optimal rules based on a desired print criterion. A print governance application can be configured with respect to a rendering server to analyze one or more rendering jobs submitted within a specified time period by considering each rendering job attributes in order to collect a rendering data. A desired print criterion can be entered by an administrator in order to manage the rendering job behavior. The collected rendering data can be analyzed to dynamically create the set of optimal rules by a rules engine in order to achieve a desired level of reduction with respect to each user based on the desired print criterion. The rules can be accepted by default and/or presented to the user for acceptance with an equated level of reduction.

20 Claims, 6 Drawing Sheets

METHOD AND SYSTEM FOR AUTOMATICALLY RECOMMENDING RULES BASED ON DESIRED PRINT CRITERIA

TECHNICAL FIELD

Embodiments are generally related to rendering devices such as, for example, printers, scanners, photocopy machines, multi-function devices, and the like. Embodiments are also related to print management systems and methods. Embodiments are additionally related to the creation of a set of optimal rules based on desired print criteria.

BACKGROUND OF THE INVENTION

Networked rendering devices can interact with an assemblage of other rendering devices, devices, client devices, servers, and other components that are connected to and communicate over a network. One example of a rendering device is a MFD (Multi-Function Device), which includes the functionality of multiple rendering devices such as printers, scanners, faxes, copy machines, and so forth. Each MFD in a network, for example, can include a variety of print capabilities options such as finishing, media quality, supply levels and size.

Organizations such as, for example, business enterprises, educational, government, and medical institutions often experience large expenditures relating to the rendering of paper documents and difficulty in controlling the flow of information by the rendered documents. The cost associated with the rendering devices can be significantly high, especially for color printing, and it may therefore be extremely beneficial to track the usage of the rendering device resource so that the cost associated therewith may be determined for accounting purpose.

The output volume of the networked rendering devices must be monitored and managed in order to optimize the rendering device allocation to reduce output costs, streamline report creation, lower paper wastage, and to ensure cost effective print governance. Conventionally, rules to control printing and to meet the cost savings with respect to each user are determined manually. Such prior art approaches however lack the ability to prove the financial impact of the print governance with respect to the rendering behavior.

Based on the foregoing, it is believed that a need exists for an improved method and system for automatically creating and recommending a set of optimal rules based on a desired print criterion, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved print management method, system, and processor-readable medium.

It is another aspect of the disclosed embodiments to provide for an improved method, system, and processor-readable medium for automatically creating a set of optimal rules based on a desired print reduction.

It is a further aspect of the disclosed embodiments to provide for an improved method, system and processor-readable medium for automatically recommending the set of optimal rules based on a desired print reduction.

The aforementioned aspects and other objectives and advantages can now be achieved as described herein. A method, system, and processor-readable medium for automatically creating and recommending a set of optimal rules based on a desired print criterion are disclosed herein. A print governance application can be configured with respect to a rendering server to analyze one or more rendering jobs submitted within a specified time period by considering each rendering job attributes (e.g., document type, simplex, color) in order to collect a rendering data. A desired print criterion (e.g., percent reduction in print and/or reduction in print cost) can be entered by an administrator in order to manage the rendering job behavior. The collected rendering data can be analyzed to dynamically create the set of optimal rules by a rules engine in order to achieve a desired level of reduction with respect to each user based on the desired print criterion. The rules can be accepted by default and/or presented to the user for acceptance with an equated level of reduction. Such an approach provides the best fit rule to automatically reduce print output costs and lower paper wastage.

The jobs transmitted to a monochrome rendering device can be ignored and the percentage and cost for each document type (e.g., email, Word, PowerPoint, Excel, PDF, text, Rich Text, etc.) can be determined. The simplex jobs can be split between the rendering devices that possess a media path with a simplex and/or a duplex capability. The percentage savings and cost for different document length ranges can be also determined. The cost can be determined by calculating price per page for each rendering device utilizing unique costs for available consumable item. The print criteria entered by the administrator can be determined and ranking can be provided based on invasive users. The best fit rules with best benefit and a least impact can be provided as an option to deploy. The rules engine controls and monitors the rendering device to enhance operational efficiencies and to enable more effective device management. Such an approach assist the user to determine the rules that can be applied to meet the requirements in reducing the print output and permits the user to employ the rules engine without learning the intricacy of the application.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
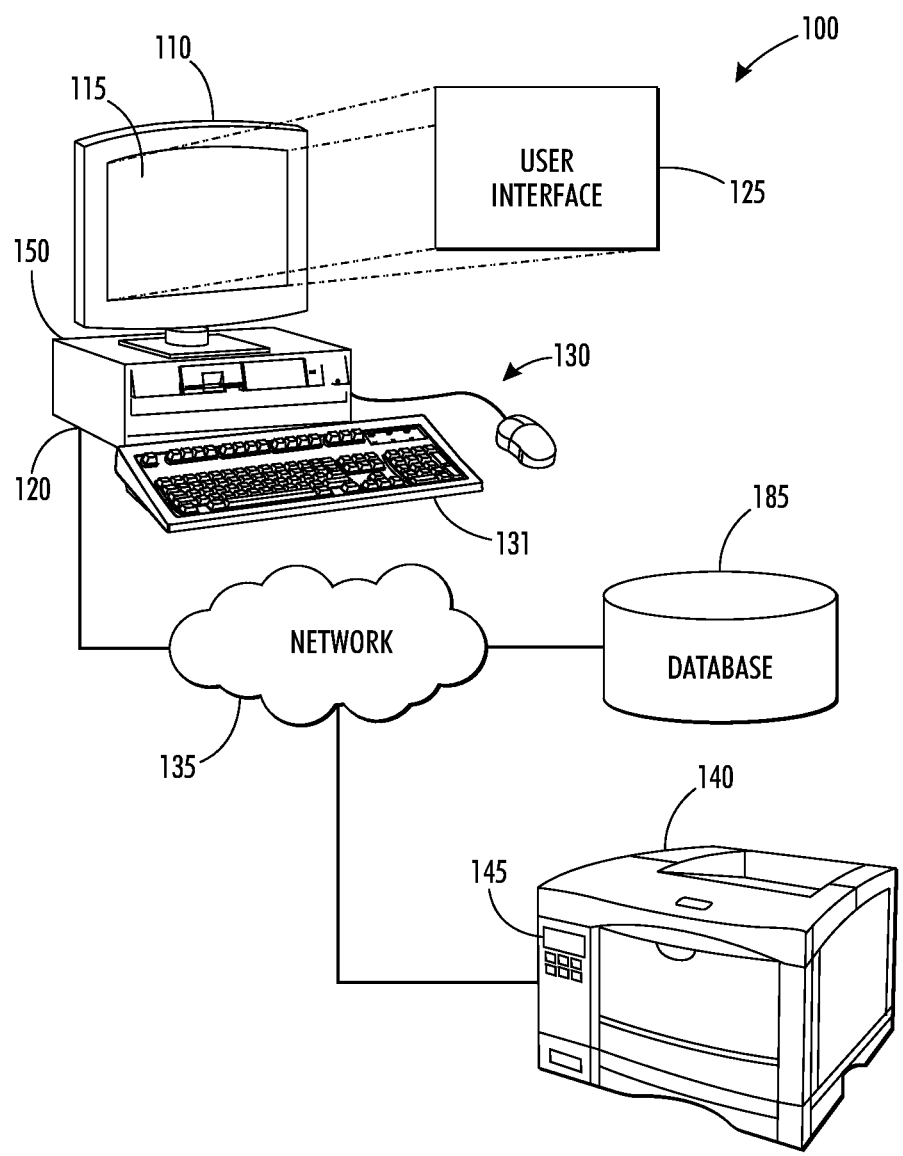
FIG. 1 illustrates an example of a rendering device coupled to a data-processing apparatus through a network, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, computer program usable medium, or computer program product. Accordingly, the disclosed embodiments can in some instances take the form of an entire hardware embodiment, an entire software embodiment, or an embodiment combining software and hardware aspects all generally referred to herein as a "module." Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Referring to FIG. 1, system 100 can be configured to include one or more networked devices, such as networked device 140, coupled to a data-processing apparatus 110 through a network 135. In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140, may be included in association with the data-processing apparatus 110 as desired.

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions such as scanning, faxing, printing and copying.

A non-limiting example of a MFD that can be utilized as rendering device 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as multifunction devices 140 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as multifunction device 140 is disclosed in U.S. Pat. No. 5,920,405, entitled "Multifunction Device With Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. The network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication fines between major nodes or host computers, consisting of thousands of commercial, government, educational, and other computer systems that route data and messages.

The networked rendering device 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the rendering device 140.

The data-processing apparatus 110 also includes a GUI 125 for communicating rendering features for processing, for example, the rendering job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interlace by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of the data-processing apparatus 110 and the networked device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
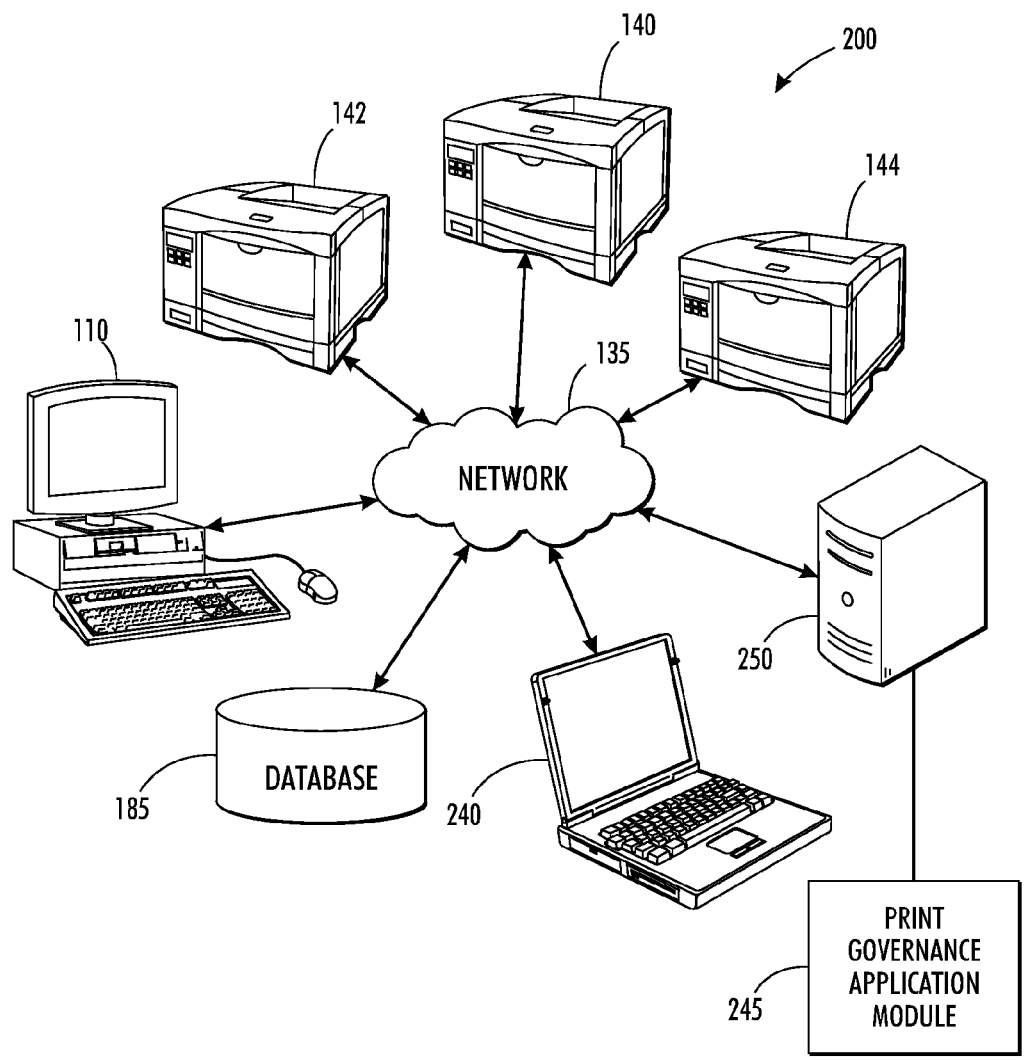
FIG. 2 illustrates a graphical representation of a print management system associated with a network, in accordance with the disclosed embodiments.

FIG. 2 illustrates a graphical representation of a print management system 200 associated with a network 135, in accordance with the disclosed embodiments. The print management system 200 generally includes the network 135 associated with one or more rendering devices 140, 142 and 144, data-processing system 110, enterprise rendering server 250, and a database 185. Data-processing system 110 depicted in FIG. 2 can be, for example, a server. Other devices such as, for example, desktops, network devices, palmtops, mobile phones, etc., may also be included in the network infrastructure 135 as service providers. The rendering devices 140, 142, and 144 can be located remotely with respect to each other, or alternatively, they may be located locally with respect to each other.

The rendering device 140 can be an office machine which incorporates the functionality of multiple devices in one so as to provide centralized document management, document distribution, and production in a large-office setting and the like. The typical rendering device 140 can act as a combination of a printer, scanner, photocopier, fax, and e-mail. While three rendering devices 140, 142, and 144 are shown by way of example, it is to be appreciated that any number of rendering devices can be linked to the network 135 such as two, four, six or more rendering devices. In general, the rendering devices 140, 142, and 144 can be employed to perform a rendering output function (e.g., printing, scanning, copying, faxing, etc.) within a networked environment. Each rendering device 140, 142, and 144 in the enterprise network 135 may collect its own data and store a persistent history associated with the data locally on the database 185 accessible by the rendering devices 140, 142, and 144. Note that rendering devices 140, 142, and 144 are generally analogous to one another.

A print governance application module 245 associated with the print server 250 can be adapted for automatically creating a set of rules based on a desired print criterion. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
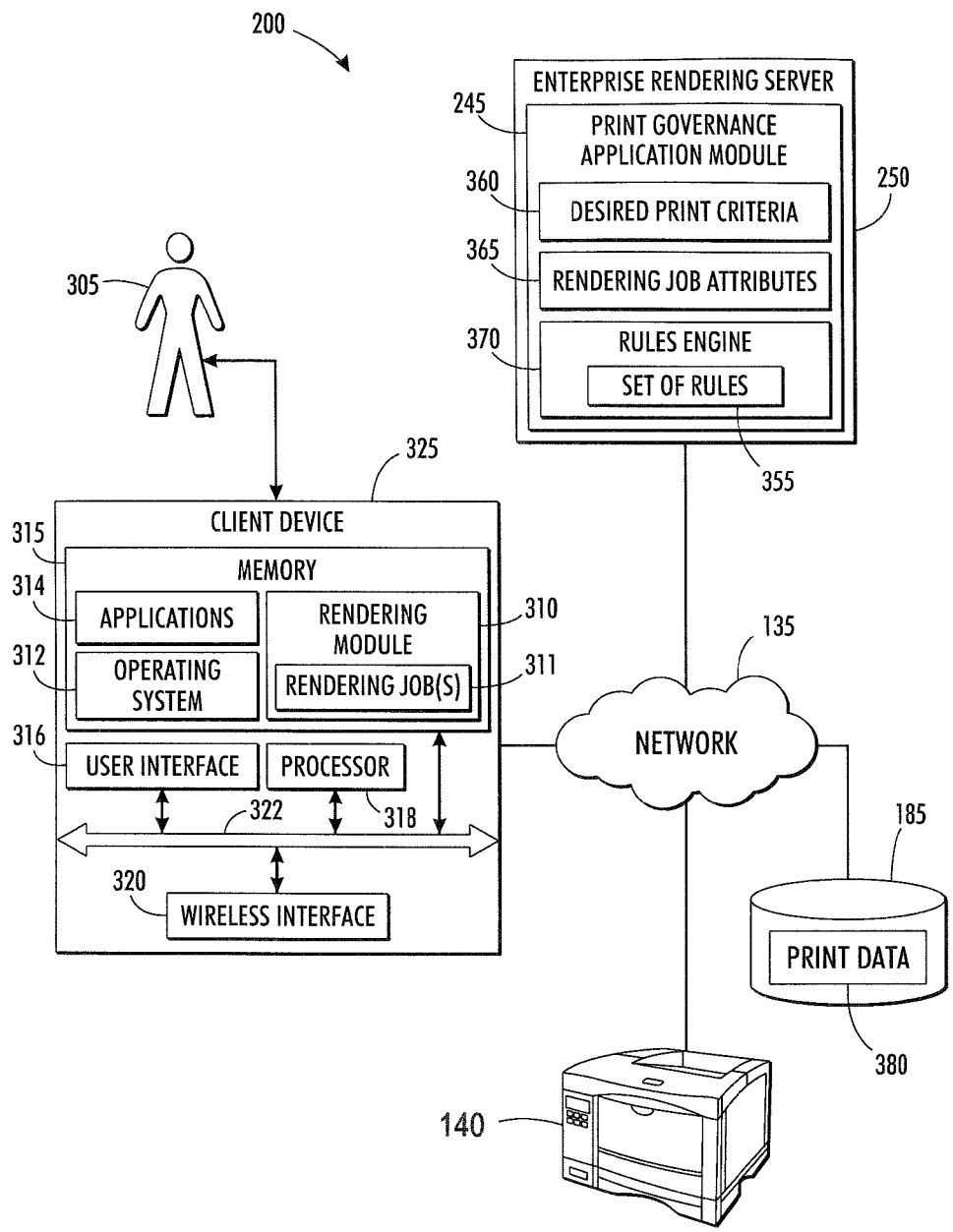
FIG. 3 illustrates a block diagram of the print management system associated with a rules engine for automatically creating a set of optimal rules based on a desired print criterion, in accordance with the disclosed embodiments.

FIG. 3 illustrates a block diagram of the print management system 200 for automatically creating a set of optimal rules 355 based on a desired print criteria 360, in accordance with the disclosed embodiments. Note that in FIGS. 1-4, identical or similar blocks are generally indicated by identical reference numerals. The print management system 200 includes a client device 325, an enterprise rendering server 250, and the rendering device 140 that are operatively communicated via the enterprise network 135.

The client device 325 includes a memory 315, a user interface 316, and a processor 318 coupled to a local interface 322. The local interface 322 can be, for example, a data bus with an accompanying control/address bus. A wireless interface 320 facilitates wireless communication with the rendering device 140, the enterprise rendering server 250, and other wireless devices via the enterprise network 135. The memory 315 stores several components that are executable by the processor 318. The components include, for example, an operating system 312, one or more applications 314, and the rendering module 310. The rendering module 310 can be utilized to submit the rendering job 311 to the enterprise rendering server 250 for rendering on the rendering device 140.

The enterprise rendering server 250 includes the print governance module 245 and a rules engine 370 to control and monitor an output resource such as, for example, the rendering device 140, to enhance operational efficiencies and enable more effective device management. The print governance application module 245 can be configured to analyze the rendering jobs 311 submitted within a specified time period by considering each rendering job attributes 365 in order to collect a rendering data 380. Note that the rendering job attributes 365 can be, for example, document type, simplex, color. The rendering module 310 installed on the data processing apparatus 110 collects the rendering job attributes 365 for network and non-networked devices and reports back to the print governance application module 245. The rendering data 380 can be stored in the database 185.

A desired print criterion 360 can be entered by an administrator 305 in order to manage the behavior of the rendering job 311. Note that the desired print criterion 360 can be for example, a percent reduction in print and/or desired reduction in print cost, depending upon design consideration. The collected rendering data 380 stored on the database 185 can be analyzed to dynamically create a set of optimal rules 355 by a rules engine 370 in order to achieve a desired level of reduction with respect to each user based on the desired print criterion 360. The rules 355 can be accepted by default and/or presented to the user for acceptance with an equated level of reduction.

Note that the data-processing apparatus 110 can be configured to function as rendering (e.g., printing) or output management system that is "aware" of production details associated with the rendering job. Note that the term "rendering job" is not limited to a particular electronic format such as a bitmap, but can include any suitable format including PDF, word processor formats, rich text (RTF), etc, as will be appreciated by those skilled in the art. The print governance module 245 monitors and manages the output volume of the networked rendering device 140 to reduce output costs, streamline report creation, and lower paper wastage. It can be appreciated that the print governance module 245 can be implemented as software module.

The jobs 311 transmitted to a monochrome rendering device can be ignored and the percentage and cost for each document type (e.g., email, Word, PowerPoint, Excel, PDF, text, Rich Text, etc.) can be determined. The print governance application module 245 can split the simplex jobs between the rendering device 140 that possess a media path with a simplex and/or a duplex capability. The percentage savings and cost for each document type and for different document length ranges can be determined. For example, the document can be grouped from 5 to 10 pages together and 10 to 20 together. The cost can be determined by calculating a price per page for each rendering device utilizing unique costs for available consumable item.

The print criterion 360 entered by the administrator 305 can be determined and ranking can be provided based on invasive users. A ranking is a relationship between a set of items such that, for any two items, the first is either 'ranked higher than', 'ranked lower than', or 'ranked equal to' the second. Thus, the print criteria 360 may be ranked based on an estimation of their relevance, making it possible for the user quickly to select the potential sources. For example, not permitting emails to be rendered in color is less invasive than not permitting power point documents to be printed in color. The best fit rules with best benefit and a least impact can be provided as an option to deploy. The print governance application module 245 can be mass deployed with respect to the data processing system 110, the enterprise rendering server 250 utilizing standard software deployment approaches by a local system administrator.

Figure 4:
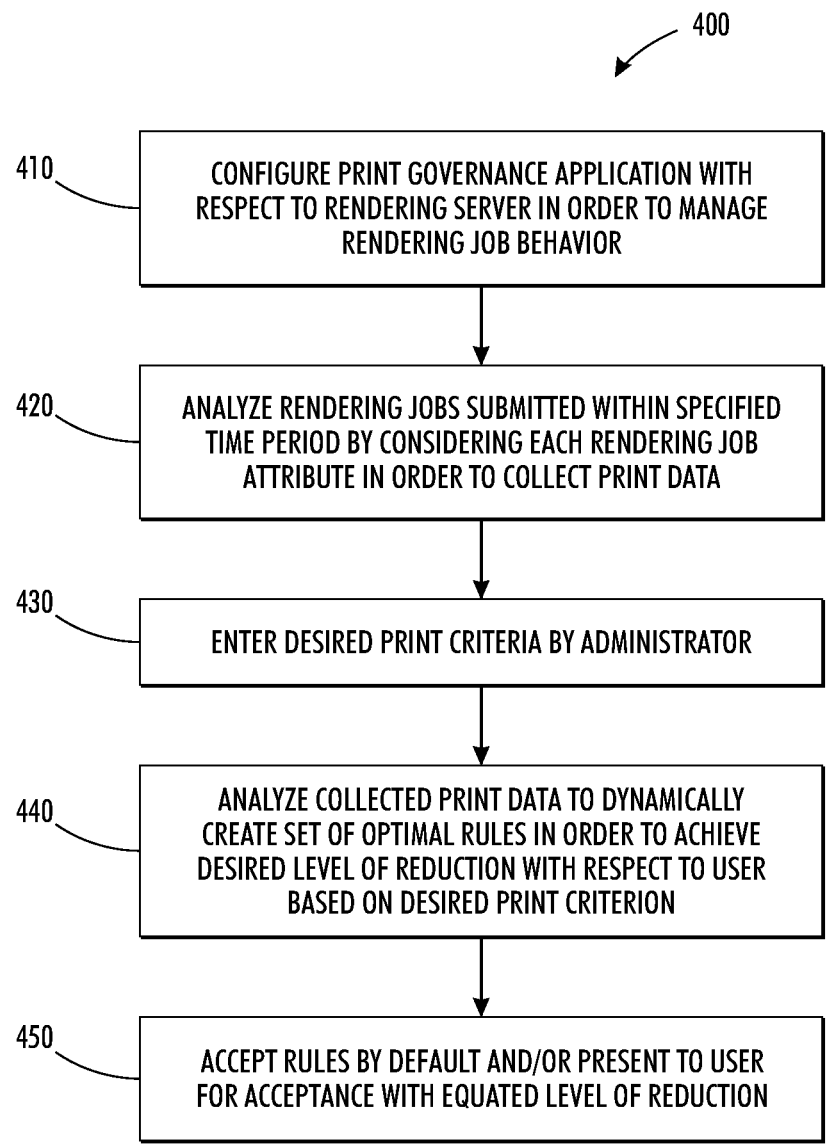
FIG. 4 illustrates a high level flow chart of operations illustrating logical operational steps of a method for automatically creating the set of optimal rules based on the desired print criterion, in accordance with the disclosed embodiments.

FIG. 4 illustrates a high level flow chart of operations illustrating logical operational steps of a method 400 for automatically creating the set of optimal rules 355 based on the desired print criterion 360, in accordance with the disclosed embodiments. It can be appreciated that the logical operational steps shown in FIG. 4 can be implemented or provided via, for example, a module such as module 245 shown in FIG. 2. As indicated at block 410, the print governance application module 245 can be configured with respect to the rendering server 250 to manage the behavior of the rendering job 311. Thereafter, as illustrated at block 420, the rendering jobs 311 submitted within a specified time period can be analyzed by considering each rendering job attribute 365 in order to collect rendering data 380. Next, as indicated at block 430, the desired print criteria 360 can be entered by the administrator 305. The collected rendering data 380 can be analyzed to dynamically create the set of optimal rules 355 to achieve desired level of reduction with respect to user based on the desired print criterion 360, as shown at block 440. Next, the rules can be accepted by default and/or presented to the user for acceptance with equated level of reduction, as depicted at block 450.

Figure 5:
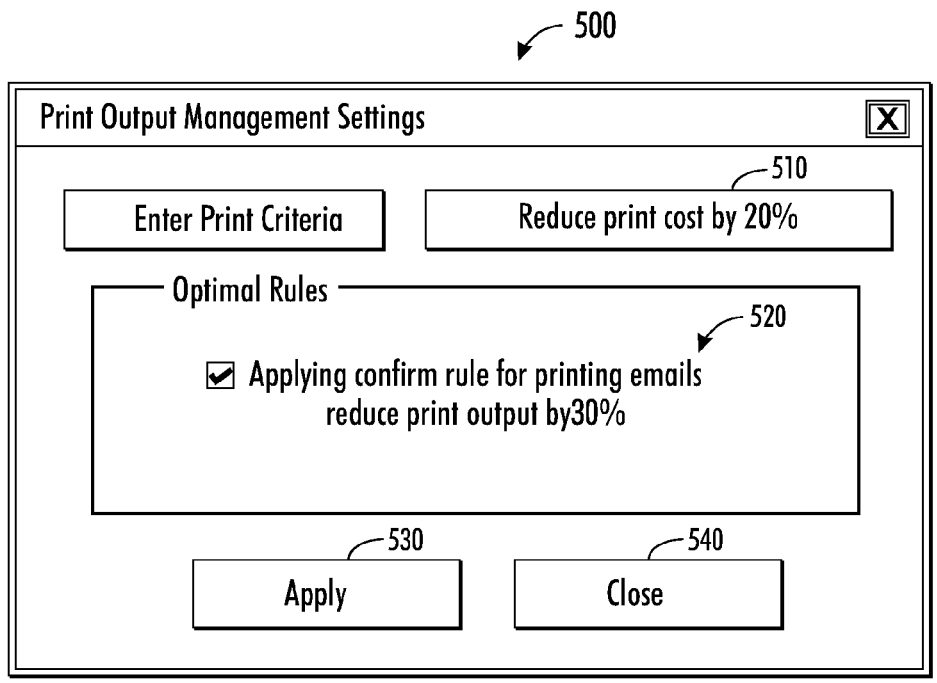
FIGS. 5-7 illustrate a pictorial view of a GUI offering selection of the optimal rules with respect to the print criterion, in accordance with the disclosed embodiments.
Figure 6:
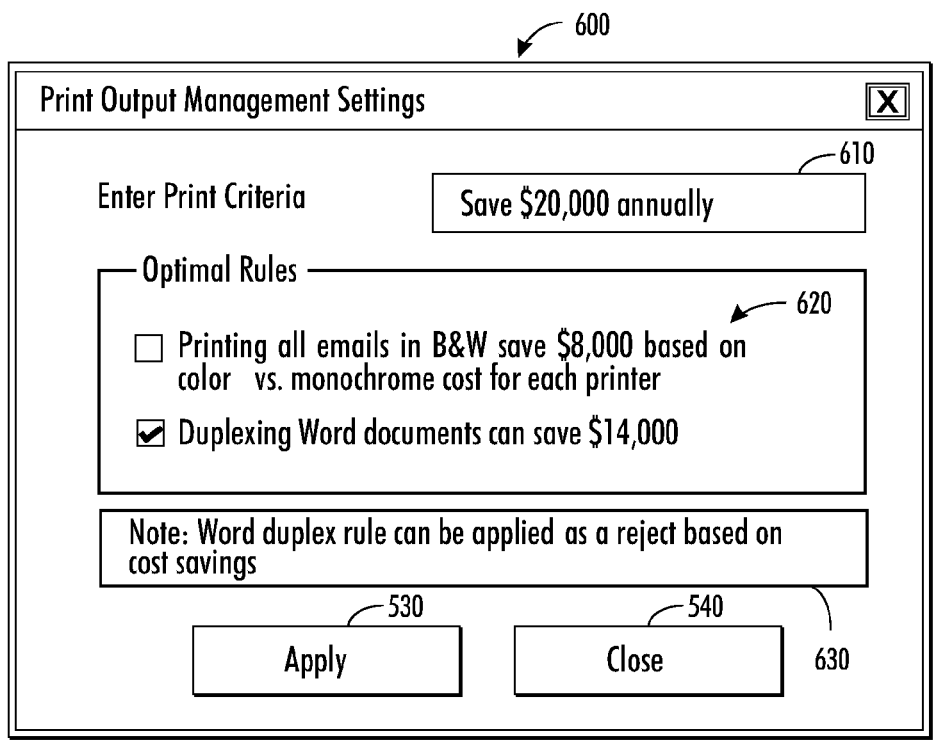
Figure 7:
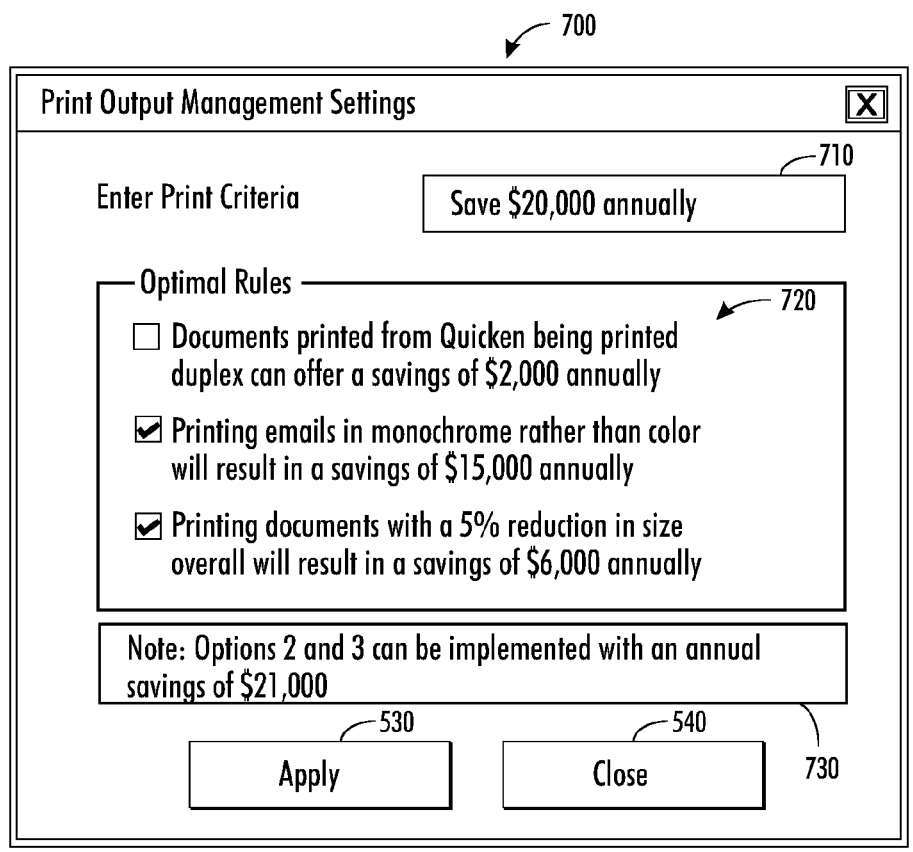

FIGS. 5-7 illustrate a pictorial view of GUI 500, 600, and 700 offering selection of the optimal rules, in accordance with the disclosed embodiments. The GUI 500, 600, and 700 can be implemented via a GUI such as, for example, the GUI 145 depicted in FIG. 1 herein, and may be provided by a module such as, for example, module 245 (e.g., a software application) shown in FIG. 2. In the illustrated figures herein, the GUI 500, 600, and 700 are generally implemented in the context of a GUI "window". Note that in computing, a GUI "window" is generally a visual area containing some type of user interface. Such a "window" usually (but not always) possesses a rectangular shape and displays the output of and may allow input to one or more processes. Such windows are primarily associated with graphical displays, which can be manipulated with a mouse cursor such as, for example, the input device 130 depicted in FIG. 1.

FIG. 5 illustrates an exemplary GUI 500 offering selection of the optimal rules for the print criteria 510 to reduce print cost by 20%, in accordance with the disclosed embodiments. The print governance application module 245 determines and displays that 30% of the rendering jobs are email rendering jobs, as indicated by arrow 520. The print governance application module 245 then notifies the administrator 305 that applying a confirm rule for printing emails can reduce print output by 30%. The administrator 305 can accept the rule by clicking the graphically displayed box 530 to apply the rule to all employees. The GUI 500 can be dosed by clicking the graphically displayed box 540. A user can interact with the user interface 500, 600, and 700 to select and operate such options by pointing and clicking with a user input device such as, for example, a touch screen. A particular item can function in the same manner to the user in all applications because the user interlace provides standard software routines to handle these elements and reports the user's actions.

FIG. 6 illustrates an exemplary GUI 600 offering selection of the optimal rules for the print criteria 610 to save $20,000 annually, in accordance with the disclosed embodiment. The print governance application module 245 determines that printing all emails in black and white can save $8,000 based on the color vs. monochrome cost for each printer. The application module 245 also determines that duplexing Word documents only can save $14,000, as indicated by arrow 620. The application module 245 notifies the administrator 305 of the two rules that can be applied and suggests that the word duplex rule can be applied as a reject based on the cost savings, as depicted at block 630. The administrator 305 reviews the suggestions and may decide that the duplex rule can be a confirmation rule by clicking the graphically displayed box 530 to apply the rule to all employees.

FIG. 7 illustrates an exemplary GUI 700 offering selection of the optimal rules for the print criteria 710 to save $20,000 annually, in accordance with the disclosed embodiment. The print governance application module 245 determines that accounting documents printed from Quicken being printed duplex can offer a savings of $2,000 annually. The application module 245 determines that printing emails in monochrome rather than color will result in a savings of $15,000 annually. The application module 245 determines that printing documents with a 5% reduction in size overall will result in a savings of $6,000 annually, as indicated by arrow 720. The application module 245 offers all three methods for reduction while also making a recommendation that options 2 and 3 can be implemented with an annual savings of $21,000, as shown at block 730. The administrator 305 reviews the findings and selects the options which most closely fit the budget requirements while not over constraining users by clicking the graphically displayed box 530. The print governance system 200 assist the users to determine the rules that can be applied to meet the requirements in reducing the print output and permits the user to utilize a rules engine (e.g., rules engine 370) without learning the intricacy of the application.

Based on the foregoing, it can be appreciated that a number of embodiments, preferred and alternative, are disclosed. For example, in one embodiment, a method is disclosed, which includes the steps of configuring a print governance application with respect to a rendering server to analyze a plurality of rendering jobs submitted within a specified time period by considering a plurality of attributes associated with each rendering job in order to collect a rendering data, and providing a print criterion in order to manage behavior of the plurality of rendering jobs. Additionally, a step can be implemented for analyzing the rendering data to dynamically create one or more rules via a rules engine (e.g., rules engine 370) in order to achieve a desired level of print reduction based on the print criterion, thereby reducing output cost and lowering paper wastage.

In other embodiments, a step can be implemented for accepting one or more of the aforementioned rules by a default option. In still other embodiments, a step can be implemented for presenting the rule(s) to the user for acceptance with an equated level of reduction. In yet another embodiment, the print criterion can comprise criteria such as, for example, a percentage reduction in print, a reduction in print cost, etc. In still other embodiments, a step can be implemented for determining the print cost by calculating a price per page for the rendering device utilizing a unique cost for an available consumable item. In other embodiments, a step can be provided for determining the percentage reduction in print and the reduction in print cost for each document and for a plurality of document length ranges.

In yet other embodiments, a step can be provided for splitting a simplex job between the rendering device that possesses a media path with a simplex and/or a duplex capability. In still other embodiments, a step can be implemented for providing a ranking based on an invasive user and the best fit rule with best benefit and a least impact as an option to deploy. In yet other embodiments, a step can be implemented for permitting a user to employ the rules engine without learning an intricacy of the application. In other embodiments, a step can be provided for controlling and monitoring the rendering device to enhance an operational efficiency and to enable more effective management of the plurality of rendering devices.

In still other embodiments, a system can be provided, which includes, for example, a processor, a data bus coupled to the processor, and a computer-usable medium embodying computer code. Such a computer-usable medium can be coupled to the data bus, and the computer program code can comprise instructions executable by the processor and configured for arranging a print governance application with respect to a rendering server to analyze a plurality of rendering jobs submitted within a specified time period by considering a plurality of attributes associated with each rendering job in order to collect a rendering data, and providing a print criterion in order to manage behavior of the plurality of rendering jobs. Additionally, such instructions can include instructions for analyzing the rendering data to dynamically create one or more rules via a "rules engine" in order to achieve a desired level of print reduction based on the print criterion thereby reducing an output cost and lowering paper wastage.

In other embodiments, such instructions can be further configured for accepting the rule(s) by a default option. In yet other embodiments, such instructions can be further configured for presenting rule(s) to a user for acceptance with an equated level of reduction. In still other embodiments, the aforementioned print criterion can comprise a percentage reduction in print, a reduction in print cost, etc. In other embodiments, such instructions can be further configured for determining the print cost by calculating a price per page for the rendering device utilizing unique cost for an available consumable item. In other embodiments, such instructions can be further configured for determining the percentage reduction in print and the reduction in print cost for each document and for a plurality of document length ranges.

In still other embodiments, a processor-readable medium can be provided, wherein the processor-readable medium stores code representing instructions to cause a processor to perform a process. The code can comprise code to, for example, configure a print governance application with respect to a rendering server to analyze a plurality of rendering jobs submitted within a specified time period by considering a plurality of attributes associated with each rendering job in order to collect a rendering data, and utilize a print criterion to manage behavior of the plurality of rendering jobs. Such code can also comprise code to analyze the rendering data to dynamically create one or more rules via a "rules engine" in order to achieve a desired level of print reduction based on the print criterion thereby reducing an output cost and lowering paper wastage. In still other embodiments, such code can comprise code to accept the rule(s) by a default option and present rule(s) to the user for acceptance with an equated level of reduction.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method, comprising:
  configuring a print governance application with respect to a rendering server to analyze a plurality of rendering jobs submitted within a specified time period by considering a plurality of attributes associated with each rendering job in order to collect a rendering data;
  providing a print criterion in order to manage behavior of said plurality of rendering jobs; and
  analyzing said rendering data to dynamically create at least one rule by a rules engine in order to achieve a desired level of print reduction based on said print criterion thereby reducing an output cost and lowering paper wastage.

2. The method of claim 1 further comprising accepting said at least one rule by a default option.

3. The method of claim 1 further comprising presenting said at least one rule to a user for acceptance with an equated level of reduction.

4. The method of claim 1 wherein said print criterion comprises a percentage reduction in print.

5. The method of claim 1 wherein said print criterion comprises a reduction in print cost.

6. The method of claim 1 further comprising determining a print cost by calculating a price per page for a rendering device utilizing unique cost for an available consumable item.

7. The method of claim 1 further comprising determining a percentage reduction in print and a reduction in print cost for each document and for a plurality of document length ranges.

8. The method of claim 1 further comprising splitting a simplex job between a rendering device that possesses a media path with a simplex and/or a duplex capability.

9. The method of claim 1 further comprising providing a ranking based on an invasive user and a best fit rule with best benefit and a least impact as an option to deploy.

10. The method of claim 1 further comprising permitting a user to employ said rules engine without learning an intricacy of said print governance application.

11. The method of claim 1 further comprising controlling and monitoring a rendering device to enhance an operational efficiency and to enable more effective management of a plurality of rendering devices.

12. A system, comprising:
  a processor;
  a data bus coupled to said processor; and
  a non-transitory computer-usable medium embodying computer program code, said non-transitory computer-usable medium being coupled to said data bus, said computer program code comprising instructions executable by said processor and configured for:
    arranging a print governance application with respect to a rendering server to analyze a plurality of rendering jobs submitted within a specified time period by considering a plurality of attributes associated with each rendering job in order to collect a rendering data;
    providing a print criterion in order to manage behavior of said plurality of rendering jobs; and
    analyzing said rendering data to dynamically create at least one rule by a rules engine in order to achieve a desired level of print reduction based on said print criterion thereby reducing an output cost and lowering paper wastage.

13. The system of claim 12 wherein said instructions are further configured for accepting said at least one rule by a default option.

14. The system of claim 12 wherein said instructions are further configured for presenting said at least one rule to a user for acceptance with an equated level of reduction.

15. The system of claim 12 wherein said print criterion comprises a percentage reduction in print.

16. The system of claim 12 wherein said print criterion comprises a reduction in print cost.

17. The system of claim 12 wherein said instructions are further configured for determining a print cost by calculating a price per page for a rendering device utilizing unique cost for an available consumable item.

18. The system of claim 12 wherein said instructions are further configured for determining a percentage reduction in print and a reduction in print cost for each document and for a plurality of document length ranges.

19. A non-transitory processor-readable medium, said non-transitory processor-readable medium storing code representing instructions to cause a processor to perform a process, the code comprising code to:
  configure a print governance application with respect to a rendering server to analyze a plurality of rendering jobs submitted within a specified time period by considering a plurality of attributes associated with each rendering job in order to collect a rendering data;
  utilize a print criterion to manage behavior of said plurality of rendering jobs; and
  analyze said rendering data to dynamically create at least one rule by a rules engine in order to achieve a desired level of print reduction based on said print criterion thereby reducing an output cost and lowering paper wastage.

20. The processor-readable medium of claim 19 wherein said code further comprises code to:
  accept said at least one rule by a default option; and
  present said at least one rule to a user for acceptance with an equated level of reduction.

* * * * *